Oct. 10, 1967
M. W. JOHNSON ETAL
3,345,946
ROCKET STAGE SEPARATOR
Filed Nov. 2, 1960
2 Sheets-Sheet 1
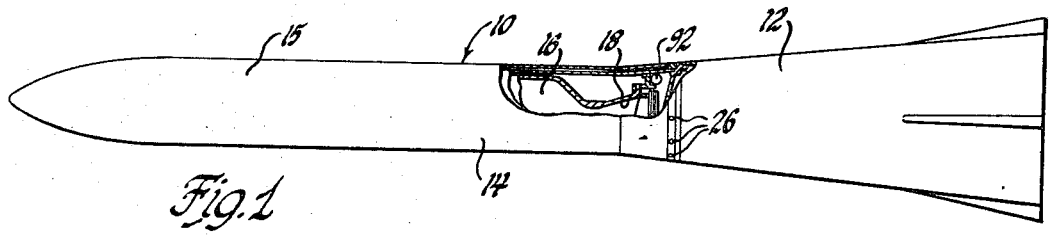
Fig. 1
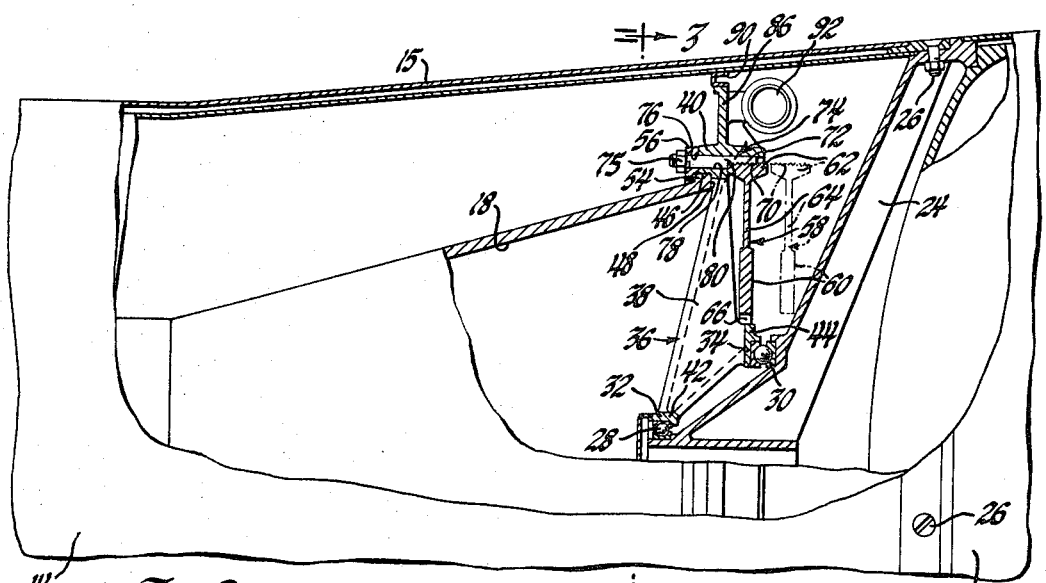
Fig. 2
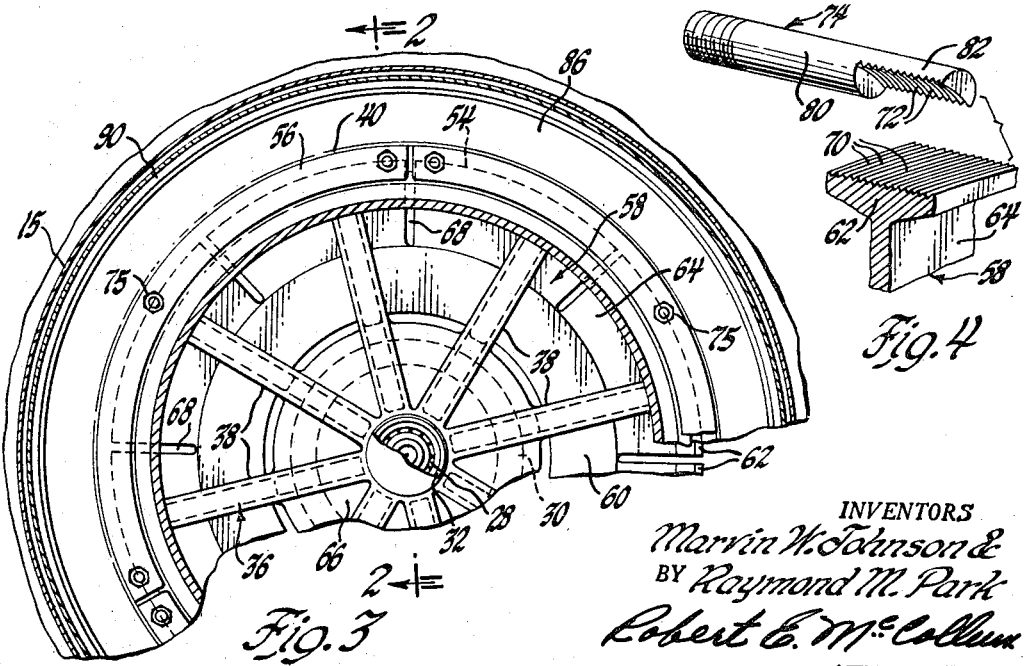
Fig. 3
Fig. 4
INVENTORS
Marvin W. Johnson &
BY Raymond M. Park
Robert E. McCollum
ATTORNEY

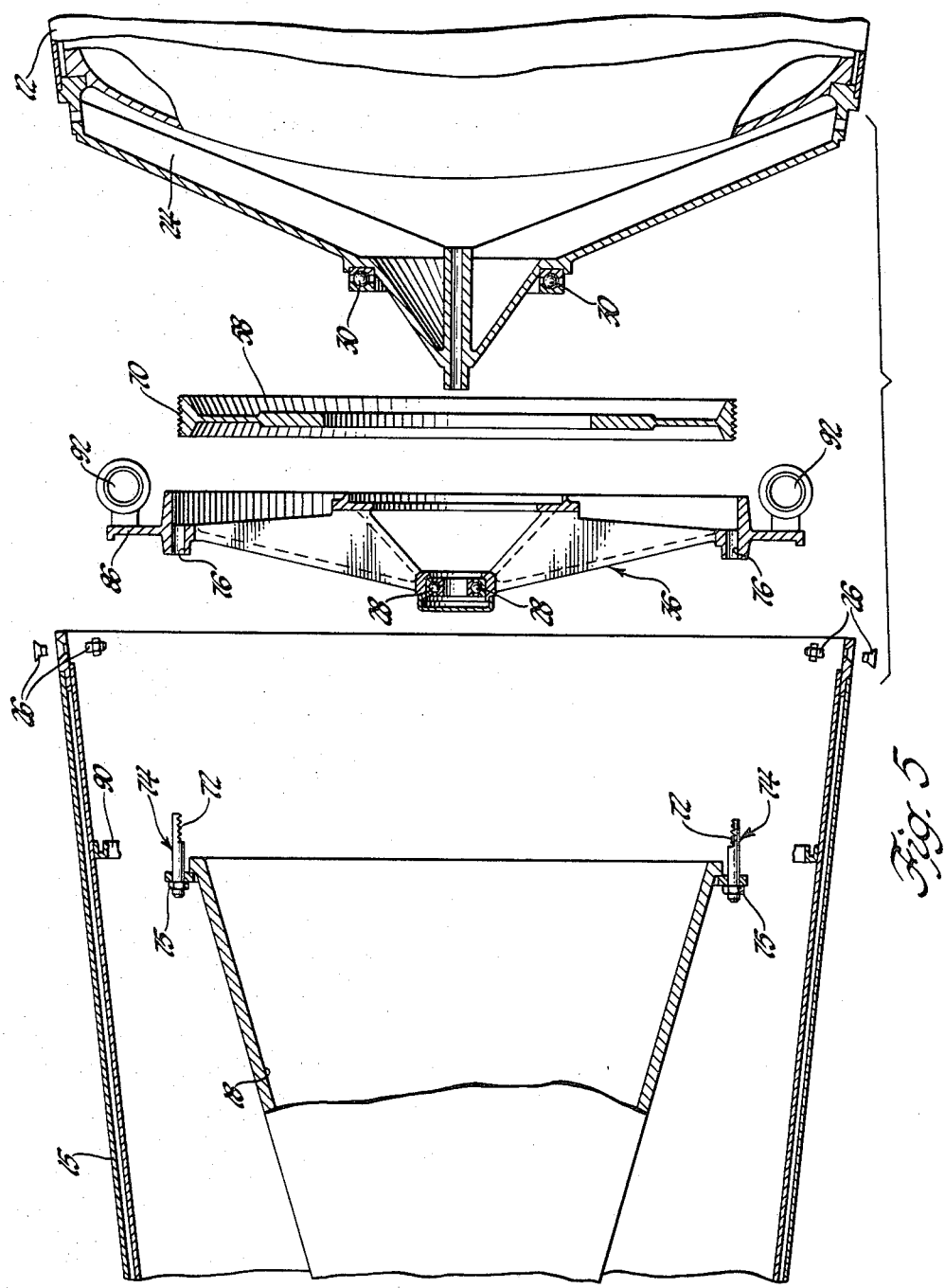

3,345,946
ROCKET STAGE SEPARATOR
Marvin W. Johnson, Indianapolis, Ind., and Raymond M. Park, Cincinnati, Ohio, assignors to General Motors Corporation, Detroit, Mich., a corporation of Delaware
Filed Nov. 2, 1960, Ser. No. 66,834
8 Claims. (Cl. 102—49.4)

This invention relates to a device for separating the stages of a multi-stage missile or the like. More particularly, this invention relates to a means for releasably connecting adjacent stages of a multi-stage missile or the like.

In multi-stage missile designs, means must be provided for maintaining all of the stages connected together for initial flight, while yet automatically decoupling and ejecting a spent stage later at the proper time. This invention provides such a construction by securing two adjacent stages together by a clamping device which includes a deformable diaphragm positioned in the path of the exhaust gases of the unused stage so that upon fire-up of that stage, the diaphragm is blown out releasing the clamp thereby decoupling the spent stage and connecting structure.

Therefore, it is an object of this invention to provide a multi-member separation device wherein one of the members includes a fluid exhaust nozzle, the device connecting the stages being operably disengaged by the force of the fluid passing through the nozzle and striking the device.

It is a further object of this invention to provide a missile stage separation device whereby the stages are clamped together by a construction including a diaphragm and bolt-like means engaging the clamped parts and the diaphragm, the fire-up of the unused stage effecting a blow-out of the diaphragm by the exhaust gases passing therethrough to release the bolt-like means and clamp and separate the stages.

Other objects, features and advantages will become apparent upon reference to the succeeding detailed description of the invention and to the drawings illustrating the preferred embodiment thereof, wherein;

FIGURE 1 is a view of a missile embodying the invention with parts broken away and in section;

FIGURE 2 is an enlarged view of a portion of FIG. 1;

FIGURE 3 is a cross-sectional view of a portion of FIG. 2 taken on a plane indicated by and viewed in the direction of the arrows 3—3 of FIG. 2;

FIGURE 4 is an exploded view of a detail, and

FIGURE 5 shows the interstage connecting structure components after separation.

The drawings, particularly FIG. 1, illustrate the invention in connection with a two stage rocket or missile 10, although it will be clear that it could be used in other installations without departing from the scope of the invention. The rocket comprises first and second stages 12 and 14 mounted on the same axis and aligned with each other.

Enclosing both of the stages is a removable annular fairing or sheet metal skin 15 providing the streamlined exterior casing to reduce drag, etc. Each stage is a complete engine in itself having a cylindrical combustion chamber 16 faired at one end to mate with a convergent-divergent conical exhaust nozzle 18 (nozzle of stage 12 not shown). Further details of the engine structure per se, such as whether or not solid fuel is used, the kind of nozzle steering control used, and other details, are not given because they are believed to be unnecessary for an understanding of the invention, may be a matter of choice, and are known. Suffice it to say that upon fire-up of the engine, the gases in the combustion chamber 16 pass into, through and out the stationary exhaust nozzle 18.

The two stages 12 and 14 are connected to each other by structure which, first, maintains the stages fastened together during initial fire-up and take-off; secondly, permits rotation of the second stage relative to the first by spin rockets just prior to fire-up of the second stage to stabilize the flight of the second stage; and thirdly, automatically separates the two stages at the proper time. The connecting structure, in general, clamps the two stages together by a bolt-like structure threadedly engaging a deformable diaphragm that is blown out by the exhaust gases upon fire-up of the second stage engine to release the structure and separate the stages.

More specifically, the upstream end of the first stage rocket casing is fastened as shown to a conical or dome-shaped interstage connecting member 24. The member may have perforations (not shown) to lighten it and is secured to the annular casing 15 at its outer edge by a number of explosive type bolts 26 for a purpose to be described later. Rotatably mounted on the member by means of annular ball bearings 28 and 30 are the hubs 32 and 34 of an annular structural support 36. As best seen in FIG. 3, the support 36 is wheel-shaped in cross-section having a number of spaced spokes or stiffening ribs 38 extending radially from the hubs 32 and 34 at one end, and rigidly joined to an annular enlarged rim 40 at their other ends. The spokes are each essentially channel shaped in cross-section for lightness and strength, with the legs being locally enlarged at 42 and 44 (FIG. 2) to accommodate the outer races of the ball bearings.

The inner surface 46 of rim 40 and the upstream faces 48 of the outer portions of spokes 38 together abut and surround a portion of an annular retaining flange 54 formed on the edge of the nozzle exit casing portion. It is the clamping structure to releasably clamp the nozzle flange and the support structure together that is the primary subject of this invention.

An annular clamping plate 56, made in four sections (FIG. 3), is aligned with and positioned against the face of rim 40 and held thereagainst by a clamping structure to be described. The plate projects inwardly to abut the face of the retaining flange 54 to act as one part of the clamping structure. Another part of the clamp consists of an annular diaphragm 58 positioned in the path of the exhaust gases and abutting the spokes 38 on their faces opposite to those abutting the nozzle flange.

The diaphragm is deformable by the pressure of the exhaust gases thereagainst, and comprises a continuous sheet metal hollow hub portion 60 and an enlarged rim 62, the two being connected by a very thin membrane section 64. The central opening 66 defined by the hollow hub portion 60 is essentially a pressure relief opening. It is of a small enough diameter to cause the necessary build-up in back pressure in the combustion chamber for engine starting purposes, while yet of a large enough diameter to prevent a blow-out or rupture of the rocket casing upon fire-up. Both the hub portion 60 and outer rim section 62 are constructed thicker than the intermediate membrane section 64 to force deflection or breakage of the member by the force of the exhaust gases to occur in this thin section. Both the membrane section 64 and the rim portion 62 are radially cut or slotted as shown at 68 at several locations around the circumference of the diaphragm. This provides a number of small thin arcuate sections to provide the diaphragm with the proper flexibility to permit it to deform or to fracture along its circumferential length. It also gives a more even distribution of pressure over the whole area of the diaphragm. The membrane sections are designed to fracture or break at a force thereagainst slightly greater than that needed for deformation.

With this thin slotted membrane construction therefore, on fire-up of the second stage rocket engine, the force of the exhaust gases acting against the diaphragm arcuately deforms the membrane sections drawing the rim sections inwardly. The membrane section 64 is so constructed and located in the path of the exhaust gases that it will rupture or be blown out to the position indicated in dotted lines in FIG. 2 by the force of the exhaust gases striking the section upon fire-up of the second stage.

The rim 62 of the diaphragm is circumferentially threaded on its outer surface at 70 (FIG. 4) for engagement with threads 72 on a number of studs 74 having nuts 75 threaded thereon at one end. Studs 74 are adapted to be slidably inserted through a number of aligned holes or bores 76 and 78 in the clamping plate 56 and rim 40, respectively, and project over the rim 62 of the diaphragm. The body portion 80 of each of the studs is half cut or arcuately milled along its longitudinal axis at one end as shown to provide an arcuate portion 82 substantially crescent shaped in cross-section. The face of portion 82 is threaded to match the threads 70 on the diaphragm rim 62.

The two stages are therefore securely joined by first, abutting nozzle flange 54 and support 36; secondly, inserting the studs through the holes in the clamping plate 56 and support rim to abut the nuts 75 and plate 56; thirdly, rotating the diaphragm to threadedly engage the diaphragm rim threads 70 and the stud threads 72 and draw the nuts 75 up tight against the plate 56 clamping the support to the nozzle between the diaphragm and plate; and finally, tightening the nuts 75.

The support 36 is additionally extended radially at 86 to form another annular rim which abuts a pilot ring 90 secured to the fairing 15. A number of spaced spin rockets 92 are secured to and project from the radial portion parallel thereto. The rockets are arranged to provide a circumferential thrust force to spin up the second stage rocket through the support structure and exhaust nozzle just prior to fire-up to stabilize the rocket on its flight path. Further details of the rockets per se are believed unnecessary to an understanding of the invention.

Therefore, the stage separation operation of this invention is as follows. As soon as suitable controls (not shown) indicate that the last or second stage rocket 14 should be fired, the explosive bolts 26 are energized by suitable means controlled by the control system. Although not shown, the location of these bolts would be on the horizontal split line of the casing 15, and the explosion of the bolts causes the entire casing both fore and aft to fall away from the two stages. Simultaneously, the spin rockets 92 are energized and begin spinning up the last stage 14 on the bearings 28 and 30. The rocket motor of stage 14 is then fired and the exhaust gases pass through and out the nozzle 18 and against the thin membrane sections 64 of diaphragm 58. Each of the sections is then arcuately deformed, contracting or drawing the rim sections inwardly to free or release the threads 70 from the stud threads 72. The entire diaphragm is then blown out by the gases to the position indicated in dotted lines in FIG. 2. This frees the support 36 to fall away from the nozzle flange 54, and the entire interstage connecting structure, spin-up mechanism and first stage then falls free of the second stage. The relative positions of the component parts after separation occurs is shown in FIGURE 5.

As stated previously, the membrane sections are so designed that in the event the sections do not deform sufficiently to free the rim threads 70 from the stud threads 72, the sections will fracture in the membrane portion along the circumferential length between slots under the force of the exhaust gases. The fractured rim portions will then fall away from the studs and together with the fractured inner diaphragm portions will be blown out by the gases.

While the invention has been illustrated in its preferred form in connection with a two stage rocket, it will be obvious to those skilled in the arts to which this invention pertains that the invention could be used in installations other than that illustrated and that many modifications can be made thereto without departing from the scope of the invention.

We claim:

1. An apparatus for connecting the mutually adjacent stages of a multi-stage member, one of said stages having a fluid exhaust nozzle secured thereto for the passage of exhaust fluid therethrough, said apparatus including a stage connecting structure secured to another stage adjacent to said exhaust nozzle of said one stage, said apparatus including bearing means on said stage connecting structure and on said another stage and spin rockets on said stage connecting structure adapted to be fired to cause said stages to rotatably spin with respect to one another, and clamping means engaging both said stage connecting structure and said exhaust nozzle and clamping them together adjacent the outlet of said nozzle, said clamping means comprising a plurality of parts releasably joined together, one of said parts being a diaphragm positioned in the path of said exhaust fluid and being frangible under the force of the fluid thereagainst to effect separation of said parts, the fluid passing through said nozzle striking and breaking said diaphragm thereby releasing said clamping means and permitting separation of said stages.

2. An apparatus for connecting the mutually adjacent stages of a multi-stage member, one of said stages having a fluid exhaust nozzle secured thereto for the passage of exhaust fluid therethrough, said apparatus including a stage connecting structure secured to another stage adjacent to said exhaust nozzle of said one stage, said nozzle and structure abutting each other on adjacent sides, said apparatus including bearing means on said stage connecting structure and on said another stage and spin rockets on said stage connecting structure adapted to be fired to cause said stages to rotatably spin with respect to one another, and releasable clamp means securing said stage connecting structure and said exhaust nozzle together adjacent the outlet of said nozzle, said clamp means including an annular diaphragm member frangible under the force of the exhaust nozzle fluid striking the same, said member abutting said connecting structure on a side other than said nozzle abutting side, said clamp means further including engageable means abutting said nozzle on a side other than the structure adjacent side and releasably engaging said diaphragm for securing said diaphragm and supporting structure and nozzle together, the fluid passing through said nozzle striking and breaking said diaphragm member and releasing said clamp means permitting separation of said stages.

3. An apparatus for connecting the mutually adjacent stages of a multi-stage member, one of said stages having a fluid exhaust nozzle secured thereto for the passage of exhaust fluid therethrough, said apparatus including a stage connecting structure secured to another stage adjacent to said exhaust nozzle of said one stage, said apparatus including bearing means on said stage connecting structure and on said another stage and spin rockets on said stage connecting structure adapted to be fired to cause said stages to rotatably spin with respect to one another, frangible connecting means securing said stage connecting structure and said exhaust nozzle together adjacent the outlet of said nozzle, said means including a frangible diaphragm positioned in the path of the fluid passing out through said nozzle, said connection means including bolt-like means slideably insertable through apertures in said connecting structure and threadedly engaging said diaphragm, the fluid passing through said nozzle striking and breaking said diaphragm thereby disengaging said threaded engagement with said bolt-like means and permitting separation of said stages.

4. An apparatus as in claim 3, wherein the periphery of said diaphragm is circumferentially threaded, the shaft of said bolt means having an arcuate undercut portion threaded to match the threads of said diaphragm.

5. An apparatus for connecting the mutually adjacent stages of a multi-stage member, one of said stages having a fluid exhaust nozzle secured thereto for the passage of exhaust fluid therethrough, said apparatus including a stage connecting structure secured to another stage adjacent to said exhaust nozzle of said one stage, said apparatus including bearing means on said stage connecting structure and on said another stage and spin rockets on said stage connecting structure adapted to be fired to cause said stages to rotatably spin with respect to one another, and clamping means engaging both said stage connecting structure and said exhaust nozzle and clamping them together adjacent the outlet of said nozzle, said clamping means comprising a plurality of parts releasably joined together, one of said parts being a diaphragm deformable under the force of the fluid thereagainst passing through said nozzle to effect separation of said parts, the fluid passing through said nozzle striking and deforming said diaphragm and blowing it out to a different location releasing said clamping means and permitting separation of said stages.

6. An apparatus as in claim 5, wherein said diaphragm includes hub and rim and connecting membrane portions, said membrane portions in their free state being straight, said membrane portions being thinner than the hub and rim portions and deformable to an arcuate shape in cross-section under the force of said fluid striking the same to radially draw in said rim portions, said clamping means including interengaging means engaging said rim portions in the free state of said diaphragm to prevent separation of said parts in one direction.

7. An apparatus for connecting the mutually adjacent stages of a multi-stage member, one of said stages having a fluid exhaust nozzle secured thereto for the passage of exhaust fluid therethrough, said apparatus including a stage connecting structure secured to another stage adjacent to said exhaust nozzle of said one stage, said apparatus including bearing means on said stage connecting structure and on said another stage and spin rockets on said stage connecting structure adapted to be fired to cause said stages to rotatably spin with respect to one another, deformable connection means securing said stage connecting structure and said exhaust nozzle together adjacent the outlet of said nozzle, said means including a deformable diaphragm positioned in the path of the fluid passing out through said nozzle, said connection means including bolt-like means slideably insertable through apertures in said connecting structure and threadedly engaging said diaphragm, the fluid passing through said nozzle striking and deforming said diaphragm and blowing it out to a different location thereby disengaging said threaded engagement with said bolt-like means and permitting separation of said stages, said diaphragm having hub and rim and connecting membrane portions, said membrane portions in their free state being straight, said rim portions being circumferentially threaded to engage said bolt-like means, said membrane portions being thinner than the hub and rim portions and deformable to an arcuate shape in cross-section under the force of the exhaust fluid striking the same to radially draw in said rim portions disengaging the threadedly engaged bolt-like means and rim portions.

8. A separable connection for stages of a multistage launch vehicle comprising: stages of a vehicle in juxtaposition; antifriction bearing means carried by one of said stages providing for relative rotational movement therebetween when in assembled position; a frangible member disposed between said stages; inner-engaging mechanism between said frangible member, one of said stages and said bearing means to form a unit; and means to rupture said frangible member thereby disengaging said inner-engaging mechanism to allow separation of said stages.

References Cited

UNITED STATES PATENTS

| | | | |
|---|---|---|---|
| 1,901,852 | 3/1933 | Stolfa et al. | 102—34.5 |
| 2,421,807 | 6/1947 | Richey et al. | 89—1.5 |
| 2,779,283 | 1/1957 | Baughman | 102—49 |
| 2,796,021 | 6/1957 | Berlin et al. | 102—7.2 |
| 2,809,584 | 10/1957 | Smith | 102—49 |
| 2,951,421 | 9/1960 | Katzen | 89—1.5 |
| 3,011,405 | 12/1961 | Moss et al. | 89—1.5 |
| 3,070,015 | 12/1962 | Ledwith | 102—49 |

OTHER REFERENCES

Swanson: "A Five Stage Solid-Fuel Sounding Rocket System," NASA MEMO 3-6-59L, March 1959, TL 521 A 35m (pp. 3, 16 relied on).

BENJAMIN A. BORCHELT, *Primary Examiner.*

ARTHUR M. HORTON, SAMUEL FEINBERG,
*Examiners.*

L. W. SANDERS, V. R. PENDEGRASS,
*Assistant Examiners.*